No. 610,776. Patented Sept. 13, 1898.
W. THOMSON.
TILE.
(Application filed Apr. 23, 1898.)
(No Model.)
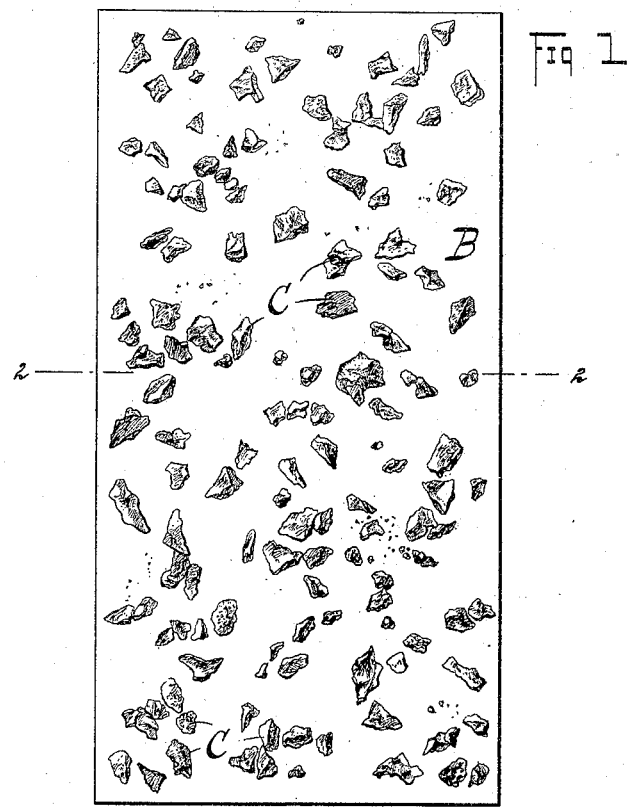
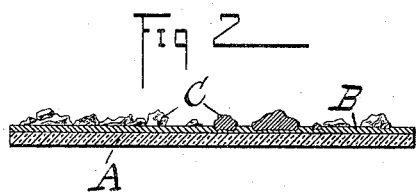
WITNESSES:
INVENTOR
W. Thomson
BY
ATTORNEYS.

UNITED STATES PATENT OFFICE.

WILLIAM THOMSON, OF MANCHESTER, ENGLAND.

TILE.

SPECIFICATION forming part of Letters Patent No. 610,776, dated September 13, 1898.

Application filed April 23, 1898. Serial No. 678,632. (No model.)

*To all whom it may concern:*

Be it known that I, WILLIAM THOMSON, of the Royal Institution Laboratory, Manchester, in the county of Lancaster, England, have invented certain new and useful Improvements in Tiles, of which the following is a full, clear, and exact description.

My invention relates to an improved glass tile made from opal or other glass cut or molded into such shape and size as may be desired and on the back or one side of which are fixed small pieces of granite, marble, limestone, feldspar, wood, or other material, which I call "keys" and by which the glass tiles thus produced can be readily and firmly fixed to walls or ceilings by ordinary plaster, Kean's, Parian, Portland, or other cement, or I may fix upon the glass a complete backing of ordinary earthenware or other tile or layer of hardened Portland or other cement, so as to form a composite tile with a glass face. For this purpose I employ a solution of soluble glass—*i. e.*, silicate of soda or silicate of potash, but by preference the former, which may be either the neutral or the alkaline silicate, but by preference I employ the latter, mixed with china-clay or other insoluble silicate and oxid of zinc, or the oxid of zinc may be used along with other insoluble silicate, but by preference I use a mixture of the oxid of zinc, china-clay, and a syrupy solution of the alkaline silicate of soda in the proportions of two parts (by weight) of oxid of zinc, one part of china-clay, and six parts of a syrupy solution of silicate of soda; but these proportions may be considerably varied without materially departing from the character of my invention. With this mixture or with any of the above I paint the back or one side of each tile by means of an ordinary brush, or it may be applied by a steel or other straight edge after the manner of a "doctor" used in calico-printing and in spreading melted pitch on paper or by other means. I then sprinkle onto the layer of soft paint small pieces of marble, limestone, granite, feldspar, wood, or other material; but I do not confine myself to any special material or to the size or shape of the same.

Reference is to be had to the accompanying drawings, forming a part of this specification, in which similar characters of reference indicate corresponding parts in both the figures.

Figure 1 is a plan of my improved tile as seen from the back, and Fig. 2 is a cross-section on line 2 2 of Fig. 1.

A is the body of the tile, made from opal or other glass, B is the mixture or paint above referred to and applied to the back of the body A, and C are the pieces of hard material, such as limestone, embodied in the coating B.

My object in using the above-indicated mixture or mixtures and the methods described is that the cement or cements above mentioned cover the whole of the back of the glass, so that the keys which are applied do not show through onto the face by making a contrast between the color of the keys and that of the cement employed for fixing them to the walls, and the cement itself if dark colored does not show through and discolor the tile or make any variations in color due to unequal thickness of the glass employed, which would be the case if not previously covered by such white cement or enamel. After thus applying the cements and small pieces of material to the glass or tiles I submit them to the second step of my process, which consists in heating them for one or more hours at or about the temperature of boiling water, say 220° to 240° Fahrenheit, and then allowing them to cool slowly. By this process the silicate appears to combine with the clay or other silicate and with the oxid of zinc, forming a hard enamel-like coating which is not materially affected by water and which firmly fixes the small pieces of material to the glass or tiles. These forms of cement being white add to the brightness of the tiles, which are usually semitransparent, and especially is this the case with the white opal tiles. After making the tiles I may put on a backing of Kean's, Portland, or other cement, so as to increase the thickness and strength of the tiles, and thus form a compound tile, or I may cement directly to the glass, by means of the cement and process above mentioned, another tile similar in size to the glass, which might be made of baked clay, hardened Portland or other cement, or of other material.

Having thus described my invention, I claim as new and desire to secure by Letters Patent—

1. The process of making tiles readily attachable, which consists in applying to the surface of the tile a solution of soluble glass mixed with an insoluble silicate and zinc oxid, embedding small pieces of hard material in said mixture, and heating the tile until the mixture forms an enamel-like coating.

2. A tile comprising a body or tile proper, a coating applied to the back of said body and containing soluble glass, an insoluble silicate and zinc oxid, and pieces of hard material embedded in said coating.

3. The process of making tiles and the like readily attachable, which consists in applying to the surface of the tile a solution of soluble glass mixed with an insoluble silicate and zinc oxid, and heating the tile to a temperature slightly above that of boiling water, causing the mixture to form an enamel-like coating.

4. A tile or the like, comprising a body and an enamel-like coating applied to the back thereof and containing soluble glass, an insoluble silicate, and zinc oxid.

WILLIAM THOMSON.

Witnesses:
JAMES PORTER SHENTON,
FRANK DURDEN.